United States Patent [19]

Fukuma

[11] Patent Number: 5,013,117
[45] Date of Patent: May 7, 1991

[54] METHOD FOR MANUFACTURING A FIBER TYPE COUPLER

[75] Inventor: Masumi Fukuma, Yokohama, Japan

[73] Assignee: Sumitomo Electric Industries, Ltd., Osaka, Japan

[21] Appl. No.: 421,098

[22] Filed: Oct. 13, 1989

[30] Foreign Application Priority Data

Oct. 25, 1988 [JP] Japan .................................. 63-269105
Oct. 26, 1988 [JP] Japan .................................. 63-270009

[51] Int. Cl.$^5$ .............................................. G02B 6/26
[52] U.S. Cl. .............................. 350/96.15; 350/96.16
[58] Field of Search ................. 350/96.15, 96.16, 96.2, 350/96.21

[56] References Cited

U.S. PATENT DOCUMENTS 4,392,712 7/1983 Ozeki ................................. 350/96.16
4,726,643 2/1988 Imoto et al. ...................... 350/96.16
4,869,570 9/1989 Yokohama et al. .......... 350/96.16 X

FOREIGN PATENT DOCUMENTS 0095918 7/1980 Japan ................................. 350/96.21
2190762 11/1987 United Kingdom ............. 350/96.16

Primary Examiner—John D. Lee
Assistant Examiner—Stephen W. Barns
Attorney, Agent, or Firm—Stevens, Davis, Miller & Mosher

[57] ABSTRACT

This invention is the method for manufacturing the fiber type coupler by extending at least two optical fibers having coatings thereof removed, along an optical axis while fusing the optical fibers to form a coupler member, is characterized by a step of adding a tension to the coupler member along the optical axis before the coupler member is fixed to a protective member.

12 Claims, 9 Drawing Sheets

METHOD FOR MANUFACTURING A FIBER TYPE COUPLER

BACKGROUND OF THE INVENTION

1. Field of the Invention

The present invention relates to a method for manufacturing a fiber type coupler for splitting or merging a propagated light in an optical fiber, and more particularly to a method for manufacturing the fiber type coupler including a step of fusing and extending a plurality of optical fibers.

2. Related Background Art

The fiber type coupler has a function to split and couple single wavelength lights or split and merge multi-wavelength lights. The manufacturing method thereof includes a fuse extension method in which fibers are fused and extended, and a grind method in which two optical fibers having sides thereof ground are faced each other.

Figure 1:
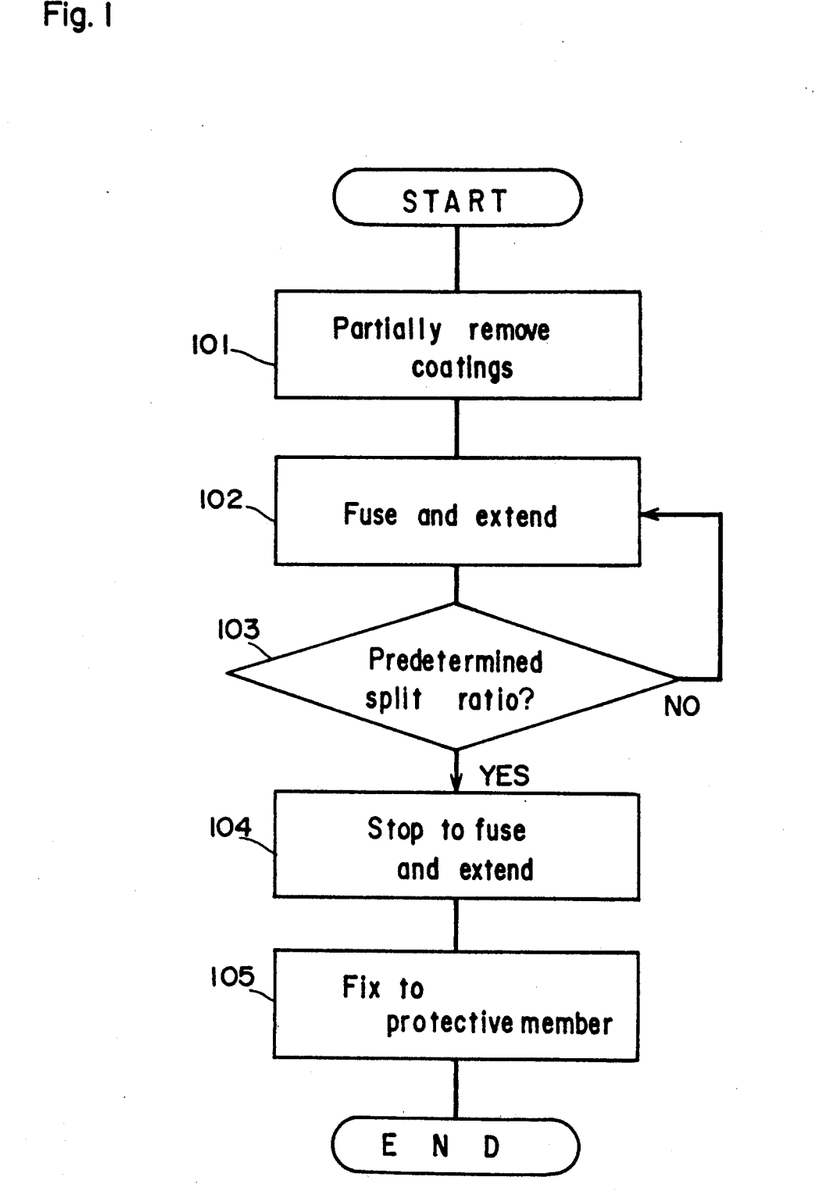
FIG. 1 shows a manufacturing method for a fiber type coupler in accordance with the related background art.

FIG. 1 is a flow chart which shows a related background art of fiber type coupler manufacturing method (fuse and extend method). (Electronics Letters, 15th Mar. 1984, Vol. 20, No. 6, PP. 230-232) A fiber type coupler which uses a single mode fiber is now explained.

Coatings of two optical fibers are partially removed and the optical fibers are contacted to each other (step 101). Then the contracted areas are fused parallelly by heating them with a burner and then the optical fibers are extended along the optical axis (step 102). In this case, a light applied to one end of the optical fiber is measured at the other end to detect a light split ratio (step 103). If a predetermined split ratio is obtained, the extension of the optical fiber is stopped and a coupler member is formed (step 104). Then, the coupler member is fixed and bonded to a protective member to form the fiber type coupler (step 105).

In other related background art method, two optical fibers are not fused and extended but twisted and heated and extended ("A Discussion on A Manufacturing Method of a Biconical Tapered Distributor", 1984 National Conference of Light-Electromagnetic Wave Section of the Institute of Electronics and Communication Engineers of Japan).

The related background art fiber type coupler is fixed to the protective material by the bonding material. The coupler whose diameter has been reduced by the extension has a diameter of less than 20 μm which is almost one tenth of the diameter before the extension.

As a result, the tensile strength at the coupler is remarkably reduced, and it may be broken in the heat cycle.

Thus, the related background art fiber type coupler exhibits a low reliability is an environment where the heat cycle is applied.

SUMMARY OF THE INVENTION

It is, therefore, an object of the present invention to provide a method for manufacturing a fiber type coupler which is hardly broken in the environment of varying temperature so that the long term reliability of the fiber type coupler is improved.

In order to achieve the above object, the method for manufacturing the fiber type coupler by extending at least two optical fibers, along an optical axis while fusing the optical fibers to form a coupler member, is characterized by a step of adding a tension to the coupler member along the optical axis before the coupler member is fixed to a protective member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 2:
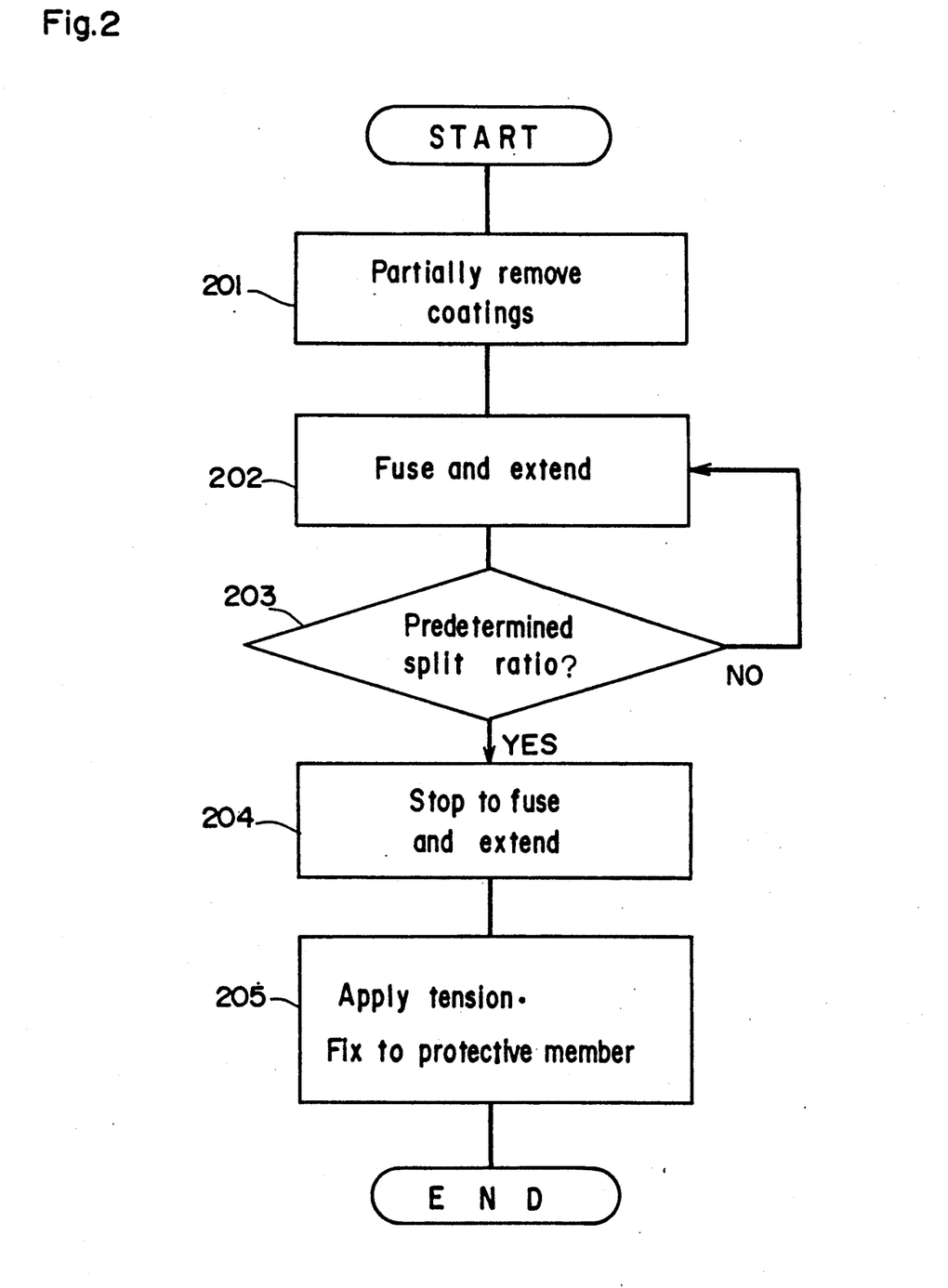
FIG. 2 shows a flow chart of a manufacturing method for a fiber type coupler in accordance with one embodiment of the present invention.
Figure 3A:
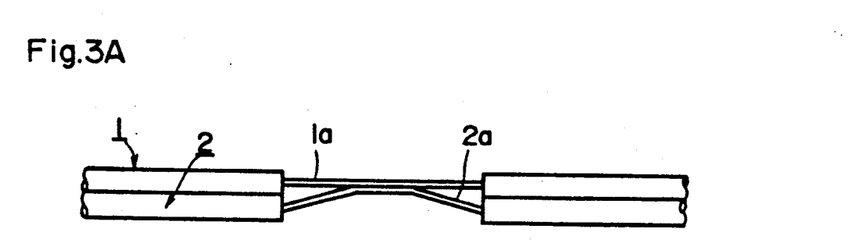
FIGS. 3A to 3D show a process chart of a manufacturing process of the fiber type coupler.
Figure 3B:
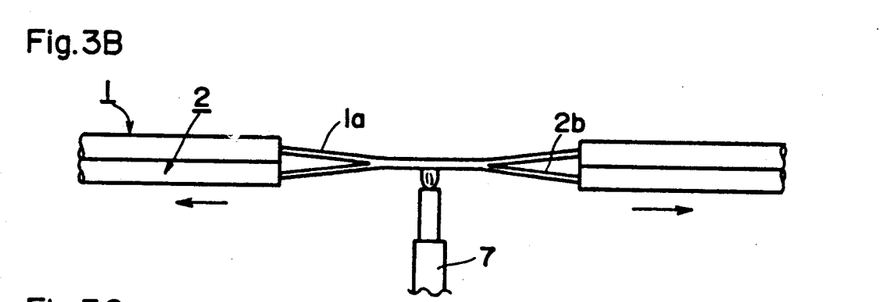
Figure 3C:
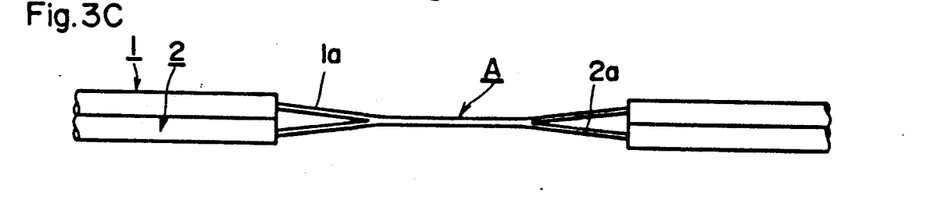
Figure 3D:
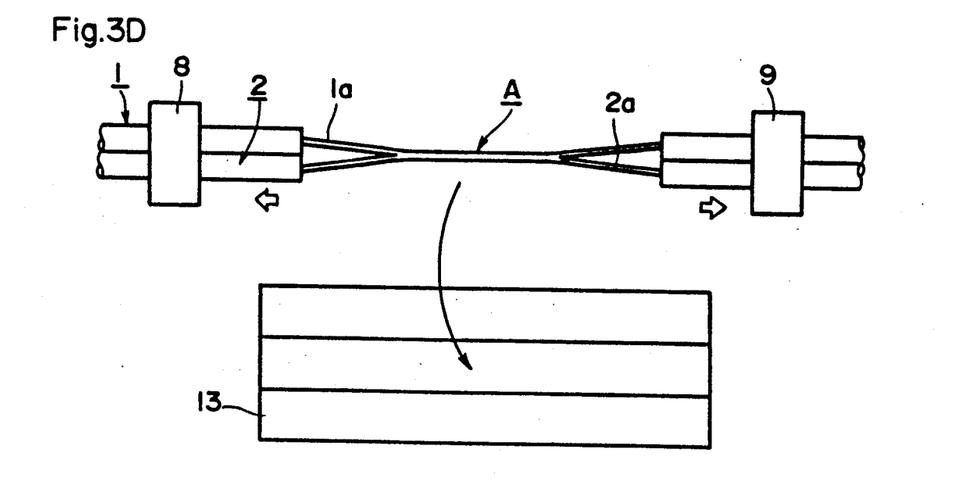
Figure 4:
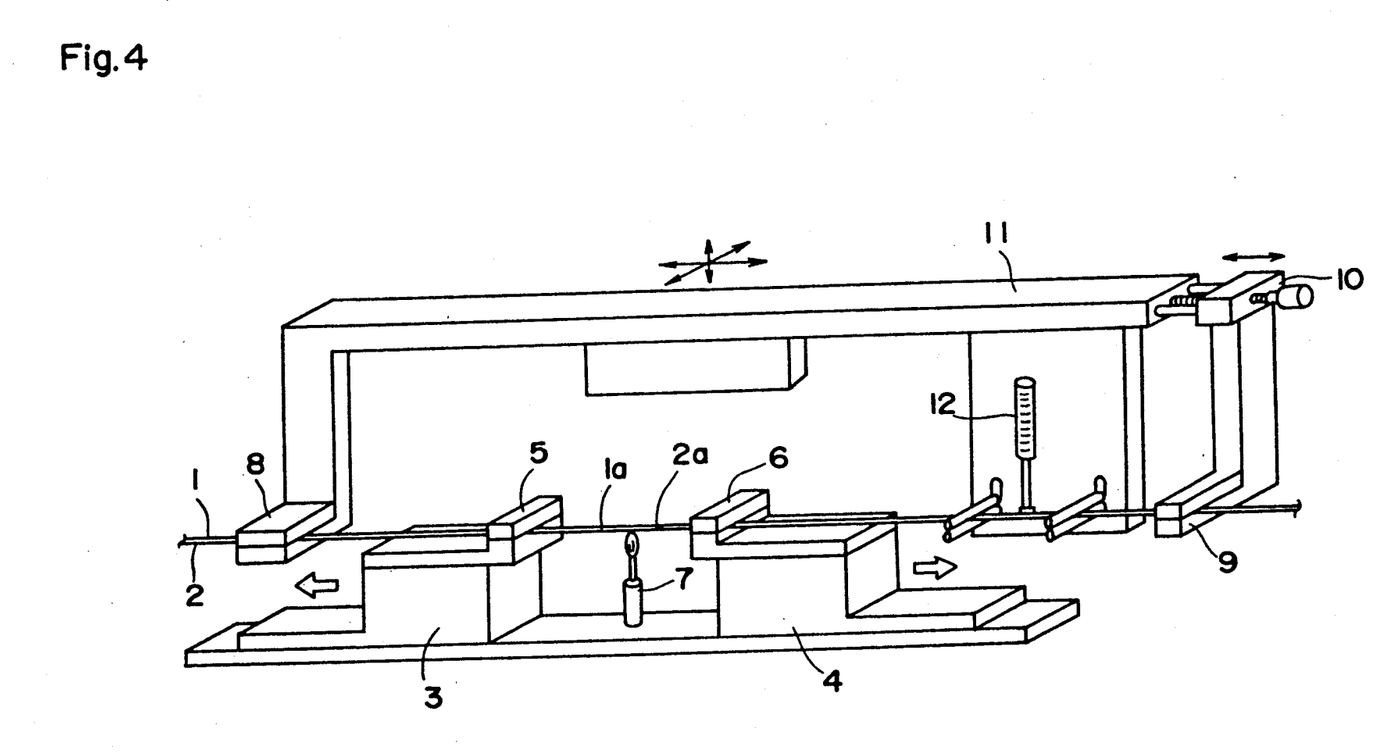
FIG. 4 shows a perspective view of a manufacturing apparatus for the fiber type coupler.

FIG. 2 shows a flow chart of the manufacturing process for the fiber type coupler in accordance with the embodiment of the present invention, FIGS. 3A to 3D show a process chart of the method for manufacturing the fiber type coupler, and FIG. 4 shows a perspective view of a fiber type coupler manufacturing apparatus.

The optical fiber wires 1 and 2 are gripped by first clamp members 5 and 6 which are fixed on fine movement stages 3 and 4 which are finely movable along the optical axis. A heating device 7 such as a burner is arranged below the portions from which the coatings have been removed. Second clamp members 8 and 9 are arranged on the both sides of the clamp members 5 and 6 along the optical axis of the optical fiber wires 1 and 2. The second clamp members 8 and 9 are mounted on a 3-way movable stage 11 which is movable in three directions (optical axis direction and two directions which are orthogonal to the optical axis) through a tension application mechanism 10. The tension application mechanism 10 includes a micrometer so that it can drive the second clamp member 9 by a unit of micron. A tension measurement device 12 is arranged between the first clamp member 6 and the second clamp member 9 to measure the tension applied to the optical fiber.

The method for manufacturing the fiber type coupler is now explained with reference to FIG. 2.

In a step 201, the coatings of the optical fiber wires 1 and 2 are partially removed, and the optical fibers 1a and 2a having the coatings thus removed are contacted to each other (see FIG. 3A) and gripped by the first clamp member 5, 6. In this case, the optical fibers 1a and 2a may be twisted each other.

In a step 202, the contact area is fused by a heating device 3 such as a burner and it is extended by the first clamp members 5 and 6 along the optical axis. (see FIG. 3B and 4).

In a step 203, a light split ratio is detected in the step of fusion and extension by measuring the light applied to one end of the optical fiber, at the other end.

In a step 204, when a predetermined light split ratio is obtained, the fusion and extension (heating) of the optical fiber are stopped, and a coupler member having a coupler A is formed (see FIG. 3C). After the coupler member has been formed, the first clamp members 5 and 6 are released and the optical fiber wires 1 and 2 are gripped by the second clamp members 8 and 9.

In a step 205, the optical fiber wires 1 and 2 are pulled along the optical axis by the second clamp members 8 and 9, and the coupler member A is fixed to the protective member 13 while the tension is applied to the optical fibers 1a and 2a (see FIG. 3D).

Figure 5A:
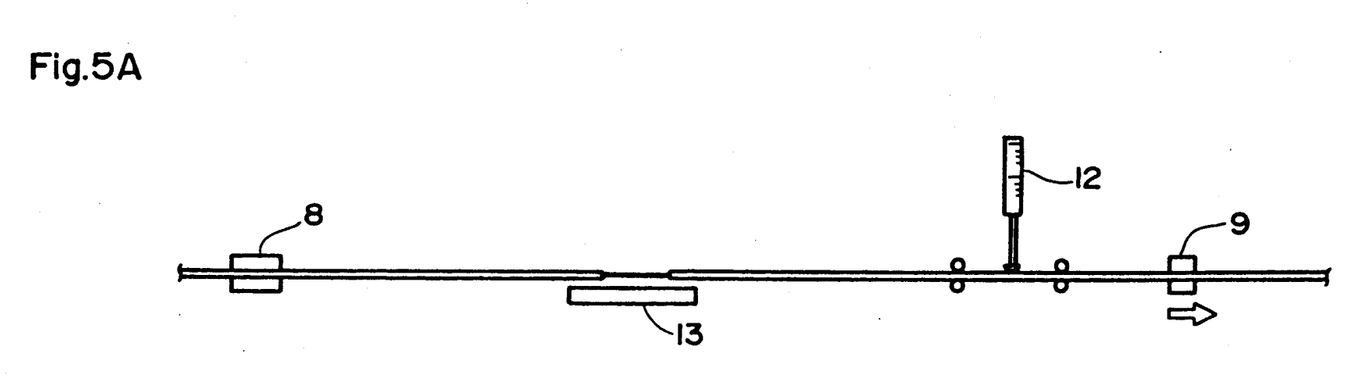
FIGS. 5A and 5B show a process chart for fixing the coupler member.

A method for fixing the coupler member is now explained with reference to FIGS. 5A and 5B. The second clamp members 8 and 9 are finely driven along the optical axis to apply a predetermined tension to the coupler member (see FIG. 5A). In this case, the tension applied may be adjusted because the tension is applied while it is monitored by the tension measurement device 12.

Figure 5B:
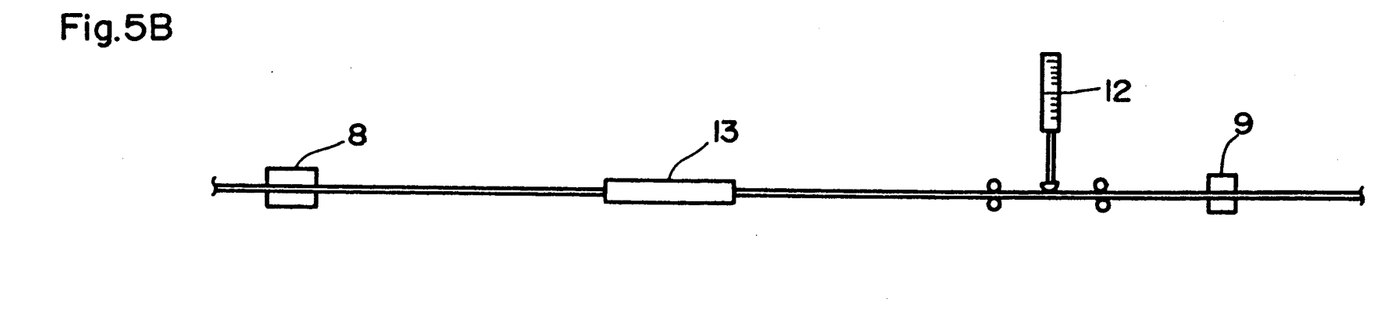

Then, with the tension being applied, the coupler member is fixed to the protective member 13 such as ceramic by the bonding material such as epoxy resin or ultraviolet ray cured resin (see FIG. 5B).

Figure 6:
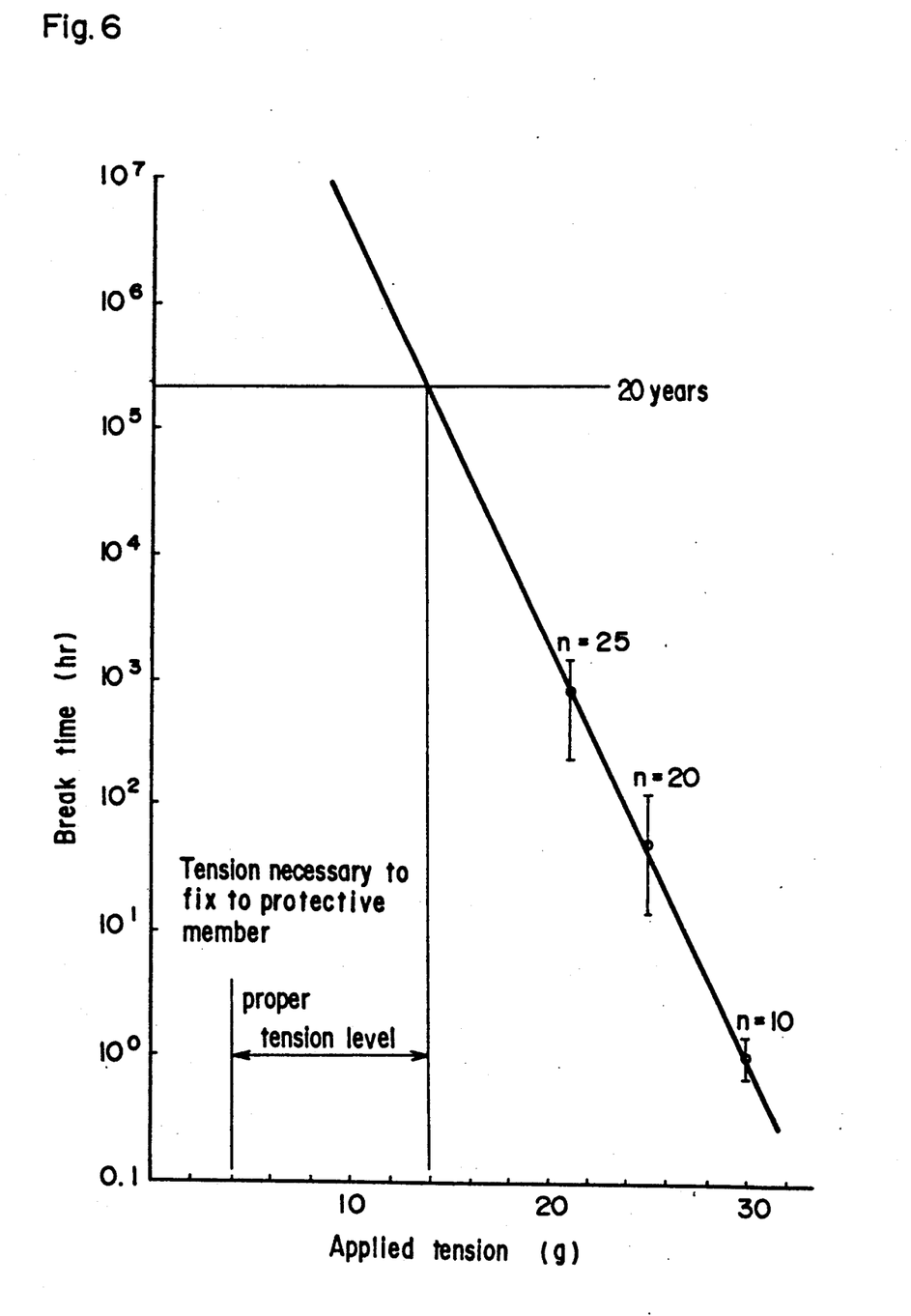
FIG. 6 shows a result of experiment relating to a relationship between an applied tension and a break time.

Referring now to FIG. 6, a result of experiment for the fiber type coupler of the present embodiment is explained. The experiment shows a relationship between the tension applied to the fiber type coupler and the break time in the extension process to apply the tension to the fiber type coupler. In the experiment, 25, 20 and 10 samples were prepared for the tension of 22 grams, 25 grams and 30 grams, respectively. An LED light source (wavelength of 1.3 μm) and a photo-diode are connected to one of the wires to measure a time to the break of the wire. If the wire is broken, the light power from the LED is not propagated and the photodiode does not detect the light power from the LED. The fiber type coupler used in the experiment has the split ratio of 50% and it can split the transmitted light having the wavelength of 1.3 μm at 50—50.

According to the experiment, in order to assure nonbreak for 20 years, the tension applied should be less than 14 grams. However, if the tension is too low, it is not possible to fix the coupler to the protective material without degrading the characteristic of the split ratio. Accordingly, it is desirable that the applied tension is set between 4 grams and 14 grams.

The present invention is not limited to the above embodiment. For example, the split ratio is not limited to 50%, and the present invention is applicable not only to the single wavelength light propagation fiber type coupler but also the multi-wavelength one.

A tapered optical fiber wire may be used as the optical fiber wire of the coupler member.

Figure 7:
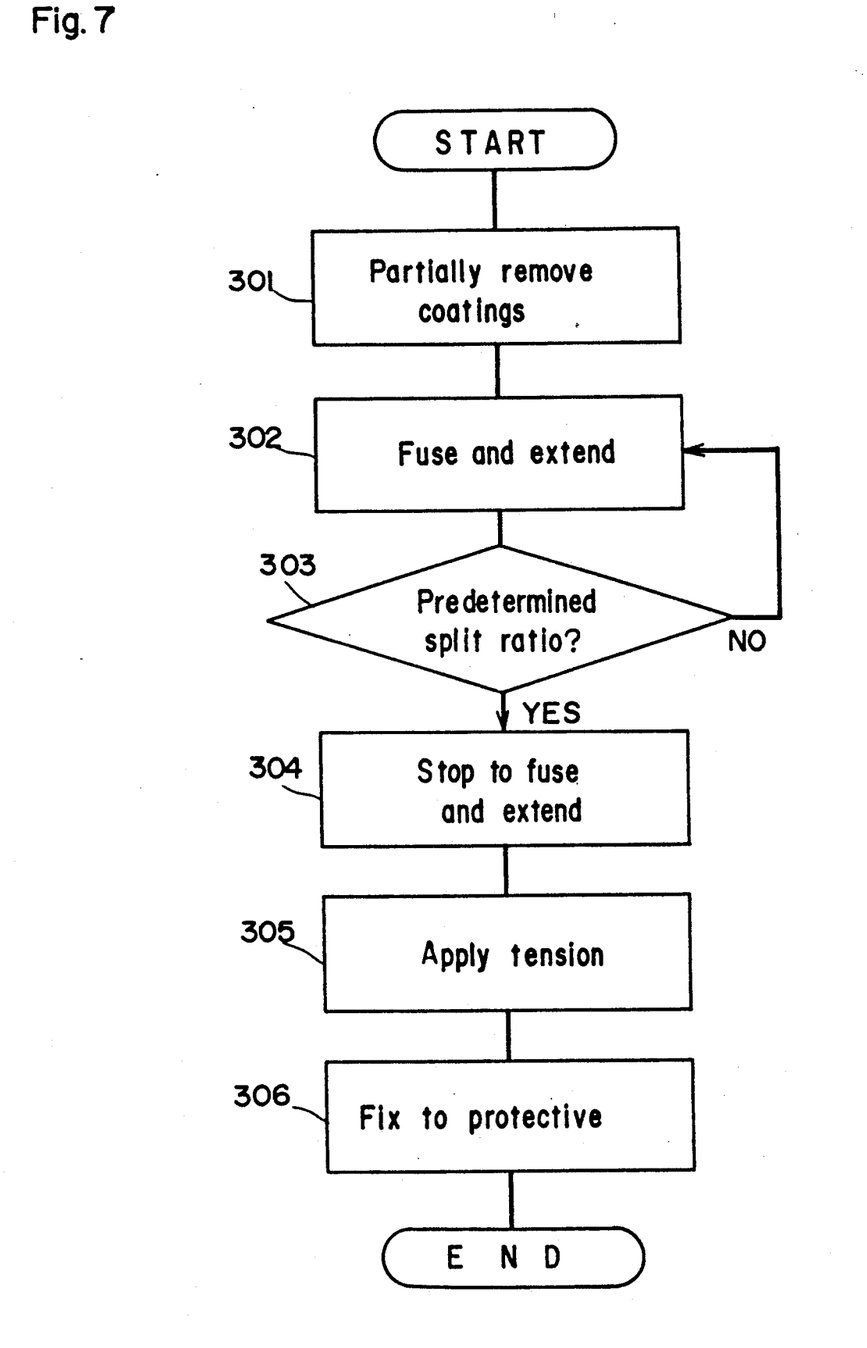
FIG. 7 shows a flow chart of a manufacturing method of a fiber type coupler in accordance with one embodiment of the present invention.

FIG. 7 shows a flow chart of the manufacturing process for the fiber type coupler in accordance with the other embodiment of the present invention, and FIG. 8A to 8E show a process chart of the method for the manufacturing the fiber type coupler.

Figures 8A, 8B, 8C:
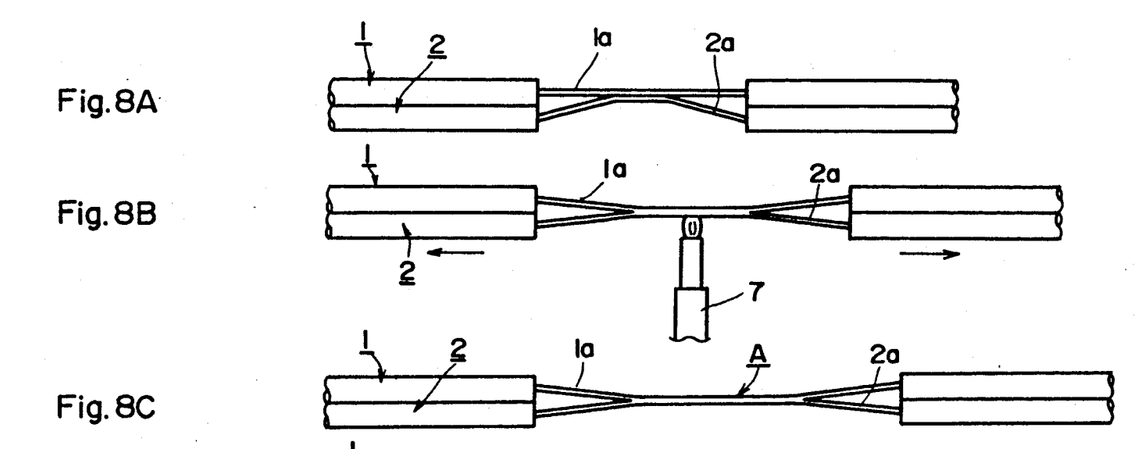
FIG. 8A to 8E show a process chart of a manufacturing process of the fiber type coupler.

In a step 301, the coatings of the optical fiber wires 1 and 2 partially removed, and the optical fibers 1a and 2aare contacted to each other (see FIG. 8A).

In a step 302, the contact area is fused by a heating device 7 such as a burner and it is extended along the optical axis. (see FIG. 8B).

In a step 303, a ligth split ratio is detected in the step of fusion and extension by measurement of the light applied to one end of the optical fiber, at the other end.

In a step 304, when a predetermined light split ratio is obtained, the fusion and extension of the optical fiber are stopped, and a coupler member having a coupler A is formed (see FIG. 8C).

Figure 8D:
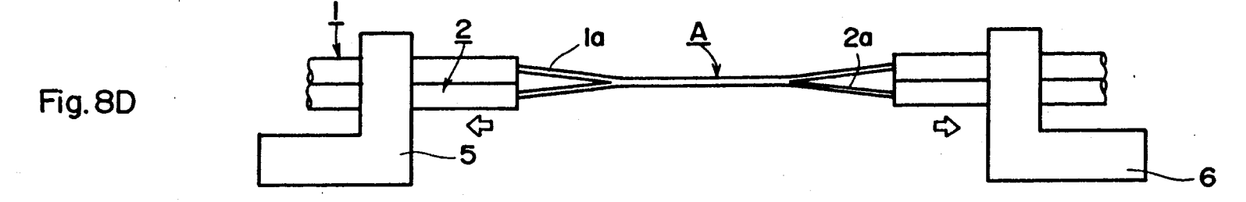

In a step 305, a predetermined tension is applied to the coupler member along the optical axis to check any break in the coupler member (see FIG. 8D).

Figure 8E:
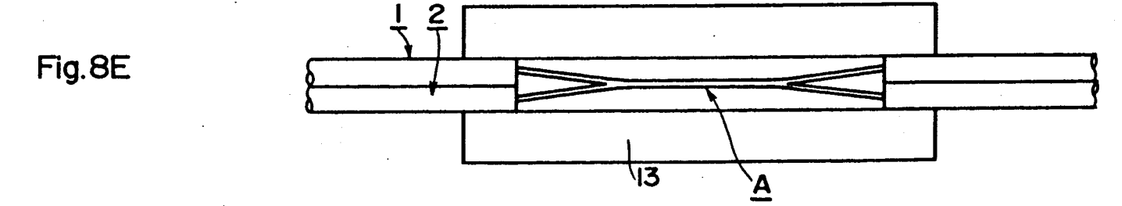

In a step 306, only the coupler member which has not been broken in the test is fixed to the protective material 4 by the bonding material such as epoxy resin or ultraviolet ray cured resin, to form the fiber type coupler (see FIG. 8E).

Figure 9A:
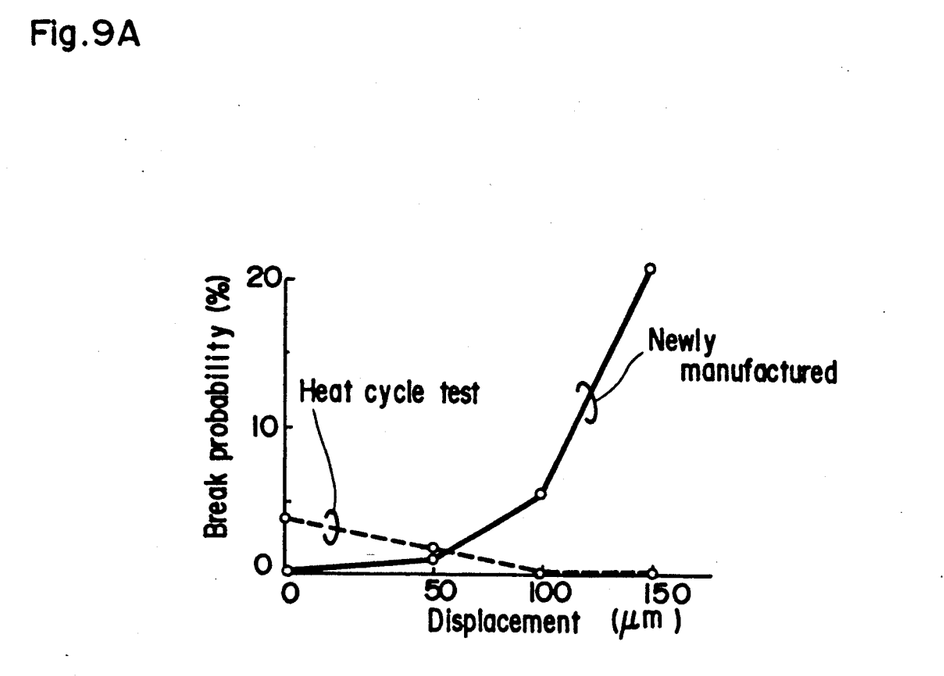
FIG. 9A and 9B show a result of experiment for the present invention.
Figure 9B:
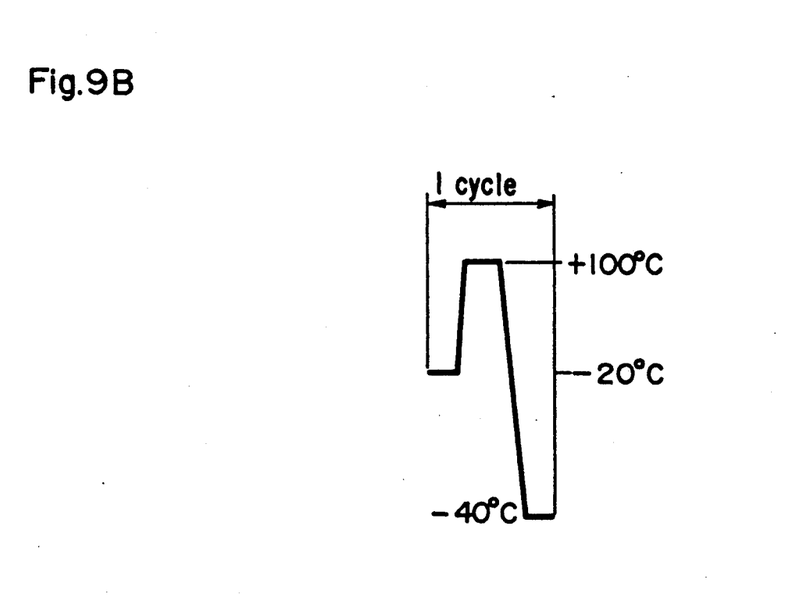

Referring now to FIGS. 9A and 9B, a result of experiment for the fiber type coupler of the present embodiment is explained. In the experiment, the fiber type coupler is extended until the predetermined split ratio is reached in the extension step. Then, it is cooled to a room temperature and pulled along the optical axis to apply the tension to the coupler A (having the diameter of approximately 20 μm). In this manner, a probability of break is examined for 70 fiber type couplers. In this case, a distance L between the fiber grip members was 25 mm, and the displacement ΔL were 50 μm, 100 μm, and 100 μm and the tension was applied for ten seconds.

In FIG. 3, the break probability for the newly manufactured fiber type couplers is shown by a solid line. Accordingly to the experiment, the break probability rapidly increases as the displacement ΔL increases.

Then, the heat cycle test shown in FIG. 9B was done 20 times for the fiber type couplers whose break probability had been examined. In the heat cycle test, the manufactured fiber type coupler is left at 20° C. for one hour, heated to 100° C. in one hour, left at 100° C. for one hour, cooled to −40° C. in one hour, left at −40° C. for one hour and heated to 20° C. in one hour to complete the cycle.

In FIG. 9A, the result of the heat cycle test is shown by a broken line. It is seen from the result of experiment that the fiber type coupler whose displacement ΔL is longer than 100 μm shows a particularly low break probability (almost 0%). It is considered that this is because the fiber type couplers having low break strength have been removed in the experiment applying increased displacement ΔL.

In general, it is effective to pull the coupler by the displacement which is longer than five times of the outer diameter of the coupler at the velocity of 10 μm (half of the diameter)/sec.

The fiber type coupler used in the experiment has the split ratio of 50% which splits the transmitted light having the wavelength of 1.3 μm at 50—50.

The excess loss is lens than 0.1 dB, and the protective material (mold case) is made of ceramic (MgO₃).

The stage for fixing the fiber grip member to extend the fiber type coupler along the optical axis is controlled by a pulse motor and a computer, and the extension and the application of the tension are accurately controlled in the order of micron.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A method for manufacturing a fiber type coupler including a coupler member and a protective member protecting the coupler member, comprising the steps of: forming the coupler member, applying a predetermined tension to the coupler member along the optical axis thereof, and fixing the coupler member to the protective member unless any breakage occurs in the coupler member in the step of applying a predetermined tension, wherein said predetermined tension includes a first tension used in tensile test for said coupler member, and a second tension being lower than said first tension.

2. A method for manufacturing a fiber type coupler according to claim 1 wherein the coupler comprises at least two optical fibers arranged in twisted state before fusing together.

3. A method for manufacturing a fiber type coupler according to claim 2 wherein said at least two optical fibers are arranged in parallel contact state before fusing.

4. A method for manufacturing a fiber type coupler comprising:

a first step of forming a coupler member by fusing at least two coating-removed optical fibers to extend the optical fibers along an optical axis thereof by directly heating the optical fibers, a second step of applying a predetermined tension to the coupler member formed in the first step along the optical axis thereof, a third step of fixing the coupler member to a protective member under a desired tension applied in the second step unless any breakage occurs in the coupler member in the step of applying a predetermined tension, wherein said predetermined tension includes a first tension used in tensile stress for said coupler member, and a second tension being lower than said first tension.

5. A method for manufacturing a fiber type coupler according to claim 4, wherein the tension is between 4 grams to 14 grams.

6. A method for manufacturing a fiber type optical coupler according to claim 4, wherein said second step includes a step of detecting a monitoring light applied to one end of said coupler member at the other end while said tension is applied thereto to check any break in said coupler member.

7. A method for manufacturing a fiber type coupler according to claim 4 wherein said tension in said second step is created by pulling said coupler member by a distance equal to five times the combined diameters of the fibers, when said diameters are measured through the center of the core of each fiber, in ten seconds.

8. An apparatus for manufacturing a fiber type coupler by extending at least two optical fibers having coatings thereof removed, along an optical axis while fusing the optical fibers to form a coupler member, comprising:

fiber grip means for gripping said at least two fibers at the both ends along the optical axis;

tension application means for applying a tension to said coupler member along the optical axis; and tension measurement means for measuring the tension applied by said tension application means, wherein the tension includes a first tension used in tensile test for said coupler member, and a second tension being lower than said first tension.

9. A manufacturing apparatus for a fiber type coupler according to claim 8 wherein said fiber grip means are mounted on a fine movable stage movable along the optical axis.

10. A manufacturing apparatus for a fiber type coupler according to claim 8 wherein said tension application means is mounted on a 3-way movable stage movable along the optical axis and two directions orthogonal to the optical axis.

11. A manufacturing apparatus for a fiber type coupler according to claim 8 wherein said tension application means has a micrometer.

12. The apparatus of claim 8 further comprising a fiber heating means, arranged between said fiber grip means, for heating said at least two optical fibers.

* * * * *